United States Patent [19]

Kelley

[11] 4,242,199

[45] Dec. 30, 1980

[54] AERATOR APPARATUS

[75] Inventor: Richard B. Kelley, Rockford, Ill.

[73] Assignee: Richards of Rockford, Inc., Rockford, Ill.

[21] Appl. No.: 40,460

[22] Filed: May 18, 1979

Related U.S. Application Data

[63] Continuation-in-part of Ser. No. 968,439, Dec. 11, 1978, abandoned.

[51] Int. Cl.³ .......................... B01F 3/04; B01F 13/02; C02F 7/00
[52] U.S. Cl. .................................... 210/758; 210/197; 210/219; 210/220; 210/765; 261/91
[58] Field of Search ............... 210/7, 14, 15, 60, 63 R, 210/63 Z, 150, 170, 194, 197, 219, 220, 221 R, 242 A, 61, 62, 221 M; 261/91, 93, 120

[56] References Cited

U.S. PATENT DOCUMENTS

| | | | |
|---|---|---|---|
| 1,230,638 | 6/1917 | Williams | 261/93 |
| 1,867,824 | 7/1932 | Hammerly | 210/194 X |
| 2,077,907 | 4/1937 | Streander | 210/197 X |
| 2,232,115 | 2/1941 | Koppers | 261/93 X |
| 2,324,593 | 7/1943 | Persson et al. | 210/14 |
| 2,719,032 | 9/1955 | Schnur | 210/220 X |
| 2,756,976 | 7/1956 | Jalma | 261/91 X |
| 2,991,983 | 7/1961 | Logan | 210/14 X |
| 3,169,921 | 2/1965 | Griffith | 210/14 X |
| 3,365,178 | 1/1968 | Bood | 261/93 X |
| 3,470,092 | 9/1969 | Bernard | 210/15 |
| 3,516,545 | 6/1970 | Larkin | 210/219 X |
| 3,521,864 | 7/1970 | Welles, Jr. | 210/242 A X |
| 3,797,809 | 3/1974 | Sydnor, Jr. | 261/91 |
| 3,846,516 | 11/1974 | Carlson | 210/242 A X |
| 3,882,017 | 5/1975 | Wittrup | 210/15 |
| 4,030,859 | 6/1977 | Henegar | 210/242 A X |
| 4,086,306 | 4/1978 | Yoshinaga | 210/242 A X |

FOREIGN PATENT DOCUMENTS

102312  8/1941  Sweden ...................... 210/14

*Primary Examiner*—Robert H. Spitzer
*Attorney, Agent, or Firm*—Robert E. Wagner; Gerald T. Shekleton

[57] ABSTRACT

An aerator apparatus for use in waste treatment plants and the like for imparting oxygen to the waste water forced through the apparatus by an axial flow impeller. The entire apparatus may be submerged, resting on the bottom of the body of water and has an intake area for directing water from the bottom of the body of water through the apparatus. The water is forced into a discharge chamber where it is aerated and agitated by a compressed oxidizing gas, such as air, through an array of ports surrounding the discharge chamber. From the discharge chamber the aerated water is directed out of the apparatus on a generally horizontal plane into the surrounding body of water. In one embodiment, the flow of water may be drawn from a certain direction and discharged in the same or opposite direction, as desired, to maintain a flow or current pattern in conjunction with a plurality of like aerators.

13 Claims, 7 Drawing Figures

U.S. Patent        Dec. 30, 1980        Sheet 3 of 3        4,242,199
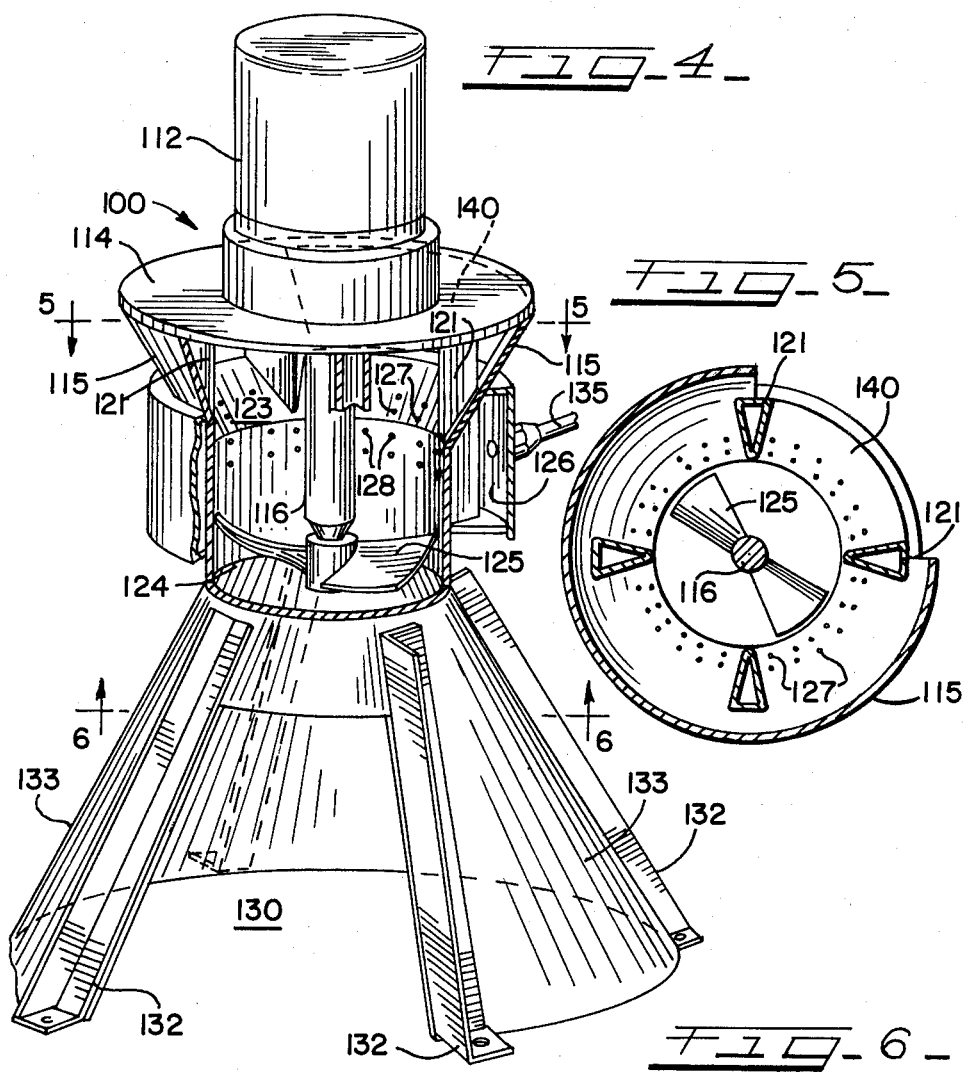

AERATOR APPARATUS

This application is a continuation-in-part of an application having the same title and filed on Dec. 11, 1978, receiving Ser. No. 968,439 now abandoned.

BACKGROUND OF THE INVENTION

The present invention relates to a fluid treatment and distribution system and, more particularly, to an apparatus and method for the aeration of a liquid such as waste water effluent or sewage.

Aeration of fluids achieves peak efficiency when thorough mixing and circulation of the parent fluid results in the entrainment of air within the liquid in the form of small bubbles and the suspension of the contained solids. Known types of aeration devices include propeller mixer equipment, paddle wheel arrangements and fountain systems. The use of any mechanical aerator increases the rate of oxygen uptake per unit time, as compared to an unaerated body, by altering the mass transfer or contacting coefficient. A direct drive high speed surface aerator achieves this increased contact in a two-fold fashion: by breaking up the volume of water pumped directly through its discharge port into a spray of discrete particle sizes causing maximum air contact over the trajectory of the spray, and by mixing the parent body of fluid. The mixing effectively distributes the oxygen dissolved in the spray, creates surface turbulence and assures the maintenance of the greatest possible driving force to the process by keeping concentration uniformity throughout the volume of water, thereby avoiding saturation of the air-water interface. This surface air-water interface is constantly disrupted by the impingement of the spray jet with the parent body of water.

For most efficient aeration and circulation, it is desirable to draw the sewage liquid from that area nearest the bottom of the pond or tank and propel that liquid upwardly where it may be aerated, as by being thrust into the air outwardly and upwardly by a direct drive surface aerator described above. Generally, such aerator apparatuses are floating devices utilizing a top mounted motor. The power consumption necessary to draw the waste liquid into the intake channel of the aerator apparatus depends largely on the length of the intake channel at a given impeller speed. As a result, such aerators generally have an intake channel extending only a short distance into the body of the waste liquid. Such aerators cannot effect a complete fluid turnover of waste liquid from the lower depths to the surface, and therefore inefficient circulation results. Were the aerator apparatus set on the bottom of the pond or tank for drawing water from such lower depths, too much power consumption would be necessary to drive the water with sufficient force to lift it upwardly and outwardly from the surface of the water for sufficient aeration. To overcome such a problem it has been suggested that the contact time of the water with the air be increased in the mixing chamber (U.S. Pat. No. 4,030,859); or that water be drawn from the bottom of the pond, aerating the water through aspiration and then discharging the oxygenated water by a propeller into the pond in a downward direction (U.S. Pat. No. 4,086,306). In addition, various floating aeration devices have aspirated air into the incoming waste liquid prior to discharging it into the air, thereby increasing the contact of the liquid with the air for accelerating the solution of oxygen in the water (U.S. Pat. Nos. 3,365,178; 3,572,658; 3,846,516 and 3,512,864).

However, the introduction of air into the liquid by aspiration does not occur with any degree of force, nor does it generate any turbulence within the water. The amount of air introduced is not great, nor does it contribute to a significant degree to the actual mixing of the air with the water to promote aeration.

SUMMARY OF THE INVENTION

It is therefore an object of the subject invention to promote the more efficient aeration of sewage liquid.

Another object of the subject invention is to provide an apparatus which has a high rate of water flow in combination with very finely divided air mixed with the flowing water.

Yet another object of the subject invention is an aerator apparatus which will draw water from the lower depths of the body of water and efficiently aerate such water.

A further object of the subject invention is an aerator apparatus which will inject air on the discharge side of the impeller in such amounts and with such turbulence as to continuously, effectively and efficiently aerate a large volume of water.

A still further object of the subject invention is an aerator apparatus capable of directionally orienting the flow of water with regard to both the intake and the discharge flow of the aerator apparatus.

These and other objects are attained in accordance with the present invention wherein there is provided an aerator apparatus for deployment on the bottom surface of a pond or lake, which, in one embodiment has a substantially unobstructed intake area spaced from the bottom surface of the pond or tank. An axial-flow impeller is located directly above the intake area and centrally positioned within the intake passageway. On the side of the propeller opposite the intake area, is a discharge chamber. The discharge chamber has a large substantially unobstructed exit opening for directing the discharge water back into the pond beneath the surface and generally horizontal or angled slightly upward. Surrounding the discharge chamber is a hollow collar which retains pressurized air or oxidizing or disinfecting gas supplied from an external source. A plurality of ports are formed in the wall common to the air collar and the discharge chamber. These ports ring the discharge chamber and inject air into the water on the discharge side of the propeller with such a force as will cause turbulence within the water, thereby generating more efficient aeration of a greater volume of water drawn from the bottom of the pond than heretofore possible.

In another embodiment, both the discharge compartment and intake compartment are partially closed in to provide a controlled directional flow of the water, the direction of the flow of the water being controlled by the particular orientation of the opening in each of the discharge and intake compartments.

DESCRIPTION OF THE DRAWINGS

Further objects of the invention, together with additional features contributing thereto and advantages accruing therefrom will be apparent from the following description of one embodiment of the invention when read in conjunction with the accompanying drawings wherein:

FIG. 3 is a cross-section taken along the lines 3—3 of FIG. 2 showing the array of air ports arranged circumferentially about the impeller on the flared portion of the discharge chamber.

FIG. 4 is a perspective view of another embodiment of the subject aerator apparatus having directional discharge and intake compartments.

FIG. 5 is a cross-sectional view taken along the lines 5—5 of FIG. 4, showing the discharge opening.

FIG. 6 is cross-sectional view taken along the lines 6—6 of FIG. 4 showing the intake opening.

FIG. 7 is a top plan view of a pond having a plurality of the aerator apparatus of the subject invention for maintaining the circulation of the pond in a circular pattern.

Referring now to FIG. 1, there is shown one embodiment of the improved aerator apparatus of the subject invention 10 which has an electric motor 12 for driving an axial-flow impeller or propeller 25 through shaft 16. While the propeller is shown with two blades, it may be possible to utilize three or more blades. The entire assembly 10 is supported on the bed of the pond or lake to be aerated by supports 32 which do not obstruct the intake area, yet adequately support the apparatus. These supports 32 may comprise any desired number for good stability and may be formed of channel iron or the like. If desired, they may be mounted on an anti-erosion plate (not shown) for inhibiting the erosion of the pond bottom caused by the rapid circulation of water.

Figure 1:
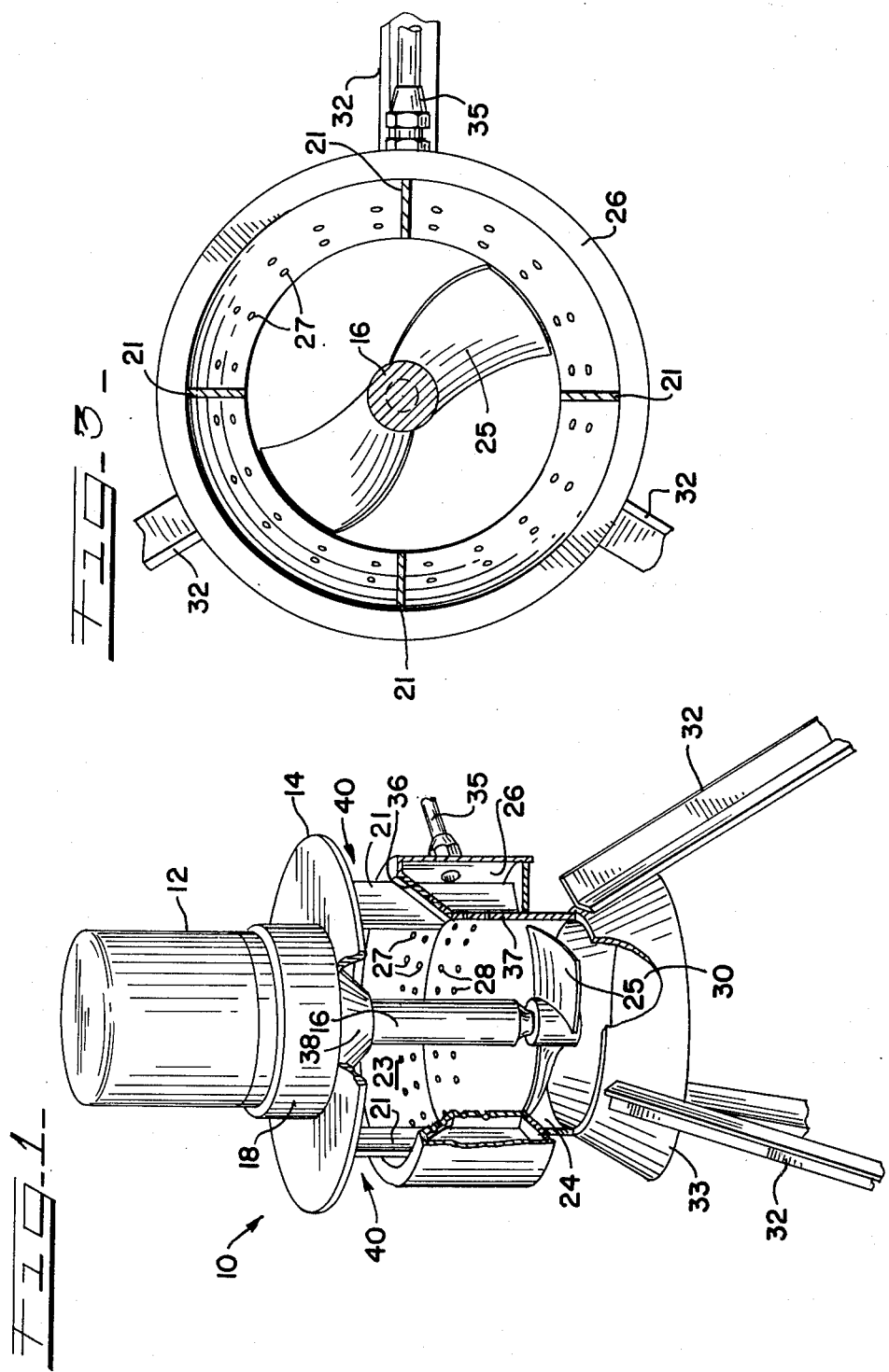
FIG. 1 is a perspective view of one embodiment of the subject aerator apparatus of the subject invention partially cut away to show the impeller and air ports within the discharge chamber.

The waste or sewage water is drawn into the intake area 30 by the propeller 25 where it is forced into the discharge chamber 23 and out the circumferential exit opening 40 along a generally horizontal path and beneath the surface of the pond or tank into which the assembly 10 sits. In the discharge chamber 23, the water is vigorously aerated, thereby enriching the oxygen content of the water by scrubbing the water of the undesirable gases and replacing these gases with air.

Figure 2:
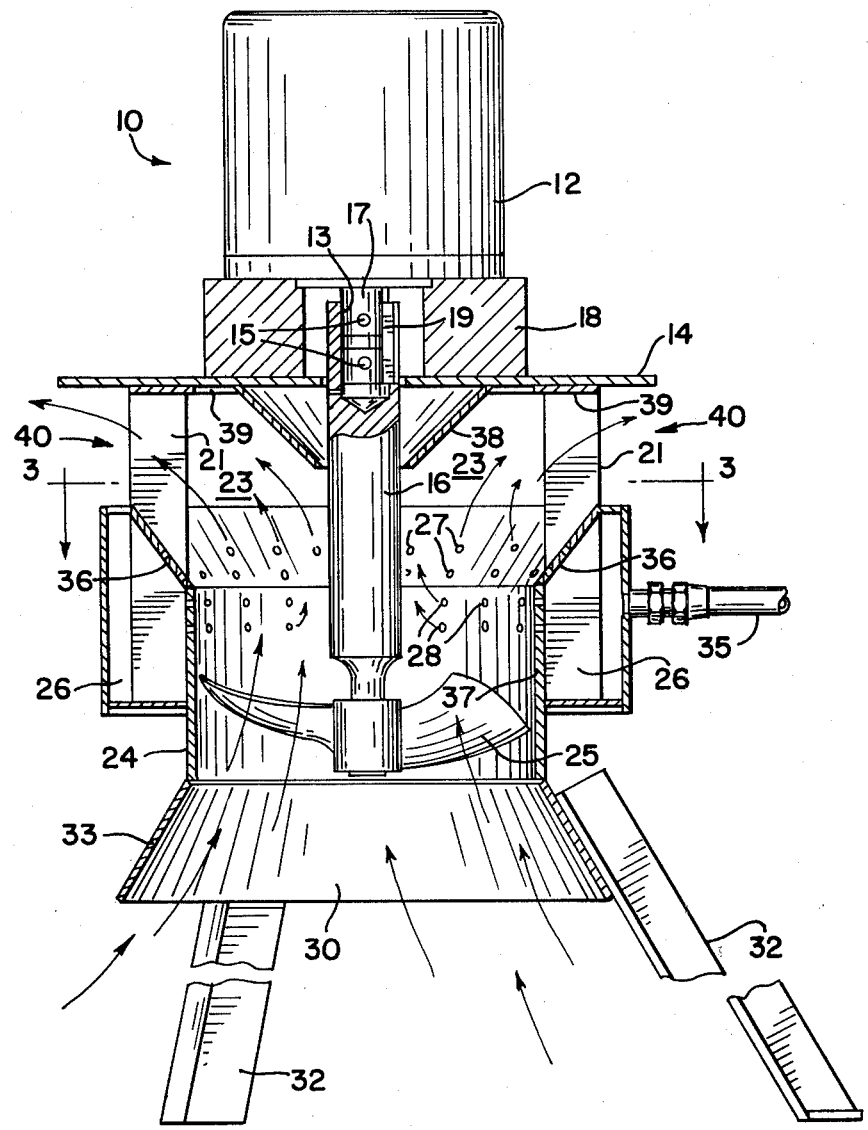
FIG. 2 is a cross-section of the aerator apparatus of FIG. 1 showing the air collar for injecting air into the water flow on the discharge side of the impeller.

The motor 12, shown in FIG. 2, is generally a single speed motor having between five and one hundred horsepower and a speed at full load of between 1,100 and 1,800 rpm. The motor is secured to the motor mounts 18 which are generally of heavy wall cast iron or malleable iron. The motor mounts 18 are in turn supported by and attached to platform 14. The motor housing and each structural element exposed to the water of the pond or tank is preferably formed of a corrosion-resistant material, such as stainless steel, and as the entire structure, including the motor, is for submerged use, the motor is waterproof and water-resistant grease is used on all joints and bearings.

The platform 14 is supported by upstanding legs 21 which, as shown in FIG. 3, may be four or any other number of legs which will support the motor assembly in a secure and stable manner while affording a maximum generally unobstructed opening 40 about the discharge chamber 23. The motor drive shaft 17 is secured to and drives the propeller shaft 16. The motor shaft 17 is inserted into a mating opening 13 in the propeller shaft 16 and secured against rotation by key 19 in a keyway and pins 15 through the motor shaft and the propeller shaft. On the lower end of the propeller 16 is a propeller 25 which on rotation of the motor shaft 17 and propeller shaft 16 rotates the propeller 25 to circulate the water upward.

On the rotation of the propeller 25, the waste water is drawn upward from the area about the base of the aerator assembly 10 into the intake area 10. The intake area 30 is circumscribed by a downwardly flaring intake shroud or shirt 33. Water is then forced from the intake area 30 through the impeller conduit 24 into the discharge side or generally circular compartment 23 where the liquid flow is directed against upper discharge chamber walls 38 and 39 into a horizontal flow and out opening 40. Upper discharge chamber wall member 38 is the wall of an inverted right cone which extends from the mounting plate 14 at roughly a 45° angle until it intersects with propeller shaft 16, terminating in a circle positioned about the shaft 16, allowing rotation of the shaft 16. Improved fluid flow is made possible by such a structure, preventing cavitation and the like.

The discharge chamber preferably has an area or volume available for fluid flow which is at least about 1.5 times, and may be at least 2 times, the area or volume available for the flow of water through the impeller conduit 24. The impeller conduit 24 may be defined as that length of conduit beginning with the leading edge of the propeller 25 and ending at approximately the point where wall 36 begins to flare outwardly from the axis of the propeller. For improved flow characteristics and a more direct and forceful flow rate, the impeller conduit is formed in a cylindrical shape with a minimal inside diameter as will be explained. The wall 36 of the discharge chamber 23 may be inclined from the axis of the propeller 25 in the range from about 20° to 80°, although as illustrated in the drawing the wall 36 is inclined about 35° from the axis of propeller 25.

It will be noted from FIG. 2 of the drawings that the converging intake conduit 33 has approximately the same dimensions as the converging wall 36 of discharge chamber 23. Accordingly, the available fluid flow area 30 of the intake conduit 30 also is at least 1.5 times and may be at least 2 times the fluid flow area of the impeller conduit 24. Likewise, the wall 33 of the intake conduit 30 also is inclined inwardly toward the axis of the propeller terminating at a point adjacent to the intake of the propeller 25; the wall 33 of the intake conduit 30 is inclined from the axis of the propeller from about 20° to about 80°, although as illustrated in the drawing the wall of the intake conduit 30 is inclined about 35° from the axis of the propeller 25.

Intake conduit 30 has an angle of convergence of at least 20° from the axis of the propeller, as stated above, and will provide a sufficient fluid flow area relative to the fluid flow area of the impeller conduit that will substantially reduce the natural swirling vortical patterns of the liquid, such as cavitation. Such a maximum flow is accomplished throughout the intake conduit without the use of flow directing vanes, as taught by the prior art.

The impeller conduit 18 preferably has a minimum axial dimension relative to the intake conduit, and desirably only sufficiently large to enclose the propeller 25 in the axial direction, so as to minimize vortical flow patterns of the liquid. The impeller conduit is of minimal length, also to minimize the vortical flow patterns. Thus, the volume ratio of the discharge area to impeller conduit area is maximized.

The present invention results in may advantages over the known forms of aerators. The pumping efficiency of the aerator 10 is increased by eliminating or by substantially reducing the swirling vortical flow patterns which are normally created within the axially pumped column of water. By reducing the combined size of the water path, the length of the impeller shaft 16 may be reduced accordingly. With the reduction in length, the tendency of the propeller to engage in undesirable lateral or radial movement is substantially reduced, thereby increasing the working life of the entire apparatus by preventing damage to bearings and the like.

Disposed circumferentially about the discharge chamber and trailing edge portion of the impeller conduit 23 is a collar chamber 26. The collar chamber 26 maintains an oxidizing gas, such as air, oxygen, ozone or the like under pressure. Other gases may be used for mixing with the pond water which have the effect of disinfecting or purifying the water, such as chlorine. In fact, liquid purifying and disinfecting agents, such as a hypochlorite may be mixed with the water in the same manner. The gas or liquid is supplied from an external source (not shown) through conduit 35 to the chamber 26. Feed chamber 26 has common walls 36 and 37 with the discharge chamber 23. Openings or ports are formed in this common wall 36 through which the air or liquid may be injected under pressure from the feed chamber 26 into the water and the discharge chamber and in common wall 37 for injection into the impeller conduit 24. As described above, wall 36 of the discharge chamber flares outwardly at a point spaced from the propeller 25. In the preferred embodiment of the subject invention a series or array of ports 27 are located on the outwardly flared portion of the discharge chamber wall 36. In addition, ports 28 are located on the trailing edge portion of the impeller conduit wall 37. Each series of ports 27 and 28 are disposed in spaced equidistant relation circumferentially about the propeller shaft on the walls 36 and 37. In the preferred embodiment, two rows of 20 each are located on each of discharge chamber walls 36 and 37. Thus, the gas or liquid is injected into each of the impeller conduit 24 and the discharge area 23, at two different angles for increased turbulence. Of course, any desired array of ports may be used, however, the above-described array has been found most effective.

In operation, motor 12 drives propeller 25 through shaft 16. The revolving action of the propeller 25 draws water into the intake area 30 of the aerator apparatus 10, forces the water through the impeller conduit 24 and discharge area 23 where a cleansing agent, such as an oxidizing gas or a disinfectant, such as hypochlorite is injected into the flow of waste water causing increased turbulence and efficient mixing of the waste water with the cleansing agent. The injection of the cleansing agent from ports 28 occurs in a direction generally towards the propeller shaft 16, while the injection of the cleansing agent from ports 27 occurs in an upward direction according to the angle of wall 36. Each series of ports 27 and 28 thereby creates a different turbulence action for increased mixing of the waste water with the cleansing agent. Thus by the forced introduction of the cleansing agent into the water, both greatly increased turbulence and aeration or, in the case of a liquid, dispersal of the liquid is accomplished. The mixed water continues outwardly through opening 40 into the surrounding water where the entrained bubbles or liquid may displace yet more pollutant gases for the oxygen enrichment and cleansing of yet more waste water.

A second embodiment is shown in FIG. 4, which, like the first, comprises an aerator apparatus which has an electric motor 112 for driving an axial flow propeller 125 through shaft 116. The entire assembly 100 may be supported on the bed of a pond or lake by supports 132. While four supports 132 are shown, any number may be utilized which will not substantially obstruct the intake opening 130 and yet provide stability for the aerator assembly 110.

In this embodiment of the subject invention, the intake area underneath the propeller 125, is partially enclosed leaving intake opening 130 for directing a flow of water from a desired direction to the propeller 125 through impeller conduit 124. The intake opening 130 may extend from a 90° arc opening to a 180° arc opening, and is preferably located for minimal obstruction by the bottom supports 132. Thus, with a 90° opening, the opening 130 would preferably be between two supports 132, as shown in FIG. 6. Similarly, a 180° opening would be between opposite supports, thereby leaving only one support 132 to obstruct the flow of water. By enclosing the intake area of the aerator apparatus with a partial shroud 133, the source of the flow of water through the apparatus might be limited to being from one general direction to the exclusion of water from the opposite direction.

The discharge chamber 123 is similarly partially enclosed with a cover or shroud 115 which extends from chamber wall 126 up to motor mount 114 and having a discharge opening 140. As with the intake opening 130, the discharge opening 140 may comprise an angle extending through a 90° arc to an angle extending through a 180° arc. The discharge opening is placed between supports 121 for minimal obstruction as with the bottom supports. As shown in FIG. 6 a 90° discharge opening 130 would preferably be disposed between adjacent supports 132. A 180° discharge opening would be situated between opposite supports 132 so that only one support would obstruct the flow of the water.

The operation of the above-described embodiment of the subject invention remains similar to that of the first described embodiment, though with a directional flow imparted to the water flowing through. As before, the revolving action of the propeller 125 draws water into the intake area through the intake opening 130 of the aerator apparatus 110. Because the intake opening 130 is directionally oriented, the flow of water into the apparatus of the subject invention is taken primarily from one direction. The water is forced through the impeller conduit 124 and into the discharge area 123 where contact with a cleansing agent is brought about. In the impeller conduit 130 and 124 and discharge area 123, an oxidizing gas such as air, oxygen, ozone, chlorine or the like, or a disinfectant liquid such as a hypochlorite is injected into the flow of waste water from the peripheral chamber 126 surrounding the mixing chamber. The peripheral chamber is maintained at a positive pressure with such gas or liquid, being connected to an outside source of the material by conduit 135. The injection of the gas or liquid into the flow of the waste water causes increased turbulence and more efficient mixing of the waste water. As in the first described embodiment, the injection of the cleansing agent from ports 128 occurs in a direction generally towards the propeller shaft 116 while the injection of the cleansing agent from ports 127 occurs in an upward direction according to the angle of wall 136. Each series of ports 127 and 128 thereby create a different turbulence action for increased mixing of the waste water with the cleansing agent. Such turbulence releases the pollutant gases from the water and replaces these gases with a cleansing agent.

By the directional intake and discharge of the waste water in this embodiment of the subject invention, it is possible to selectively direct the circulation of the waste water in a desired pattern. FIG. 7 shows one application of this capability whereby a plurality of the apparatus of the subject invention may be placed in a pond 110 to form what is known as a race-track. The pond is generally formed in the shape of an oval, and individual aerators 100 are disposed about an island 101 in the center of the pond. The aerators 100 are formed with an intake opening on a side opposite the discharge opening. Adjacent aerators 100 complement one another in that their intake opening of one aerator will accept the discharge from another aerator, thereby providing a constant flow or circulation of the waste water in a circular pattern about the pond 110. Other circulation paths and patterns may also be formed through the use of different pond shapes in conjunction with different placements and water flow-through patterns of the individual aerator apparatuses.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A method for aerating and circulating a body of water having bottom regions including the steps of:
   (1) drawing a flow of water from the bottom regions of said body of water;
   (2) directing said flow of water through a conduit into a mixing chamber;
   (3) injecting a pressurized oxidizing gas into said mixing chamber from at least two divergent angles for contact with said flow of water, said oxidizing gas being injected through ports spaced circumferentially about said mixing chamber;
   (4) causing turbulence in said flow of water with said injection of pressurized oxidizing gas, said turbulence increasing the displacement of pollutant gases in said water with said oxidizing gas; and,
   (5) directing the flow of said aerated water into said body of water on a substantially horizontal course, adjacent the water surface, whereby said water is efficiently aerated and circulated from the bottom regions of said body of water to the upper regions of said body of water in a continuous flow.

2. The method of claim 1 wherein said oxidizing gas is a gas selected from the group consisting of ambient air, oxygen, ozone and chlorine.

3. An apparatus for the circulation and mixing of water, said apparatus being placeable in an operative position in a parent body of water having lower regions comprising:

an axial flow impeller means for drawing water substantially beneath the water surface and from the lower regions of said parent body of water for maximum efficiency in the circulation of said water;

an impeller conduit for conducting the flow of water during rotation of said impeller means from an impeller inlet to an impeller outlet;

said impeller means being mounted within said impeller conduit;

means for rotating said impeller means and drawing said water through said apparatus;

intake means in communication with said impeller inlet for directing water drawn by said impeller means into said impeller conduit means;

a discharge area in communication with said impeller outlet for directing a maximum water flow from said impeller conduit into the surrounding parent body of water, said discharge area having directing means to restrict cavitation in said water flow and direct said water outward in a substantially horizontal flow underneath the surface of said parent body of water; and, an enclosed chamber disposed generally circumferentially about said discharge area and having a common wall with said discharge area and said impeller conduit, said common wall having an axial portion and a portion diverging outwardly forming an inverted cone portion above said axial portion, ports being formed on each of said axial portion and said inverted cone portion for increased turbulence and mixing of said cleansing agent with said water, said enclosed chamber being pressurizable with a cleansing agent, said cleansing agent being injectable under pressure into said discharge area through each of said ports, causing turbulence and increased mixing of said water.

4. The apparatus of claim 3 wherein said cleansing agent comprises an oxidizing gas.

5. The apparatus of claim 4 wherein said oxidizing gas is a gas selected from the group consisting of air, oxygen, chlorine and ozone.

6. The apparatus of claim 5 wherein horizontal rows of said ports are formed in said common wall, each port being equidistant from an adjacent port within the same row.

7. The apparatus of claim 6 wherein each row includes 20 ports.

8. The apparatus of claim 3 wherein said intake means is supported by and spaced a short distance from the bottom surface of the parent body of water.

9. The apparatus of claim 3 wherein said discharge area has a fluid flow volume substantially greater than the fluid flow volume of said impeller conduit means, thereby substantially reducing the impeller shaft length and reducing vortical flow patterns of said water.

10. The apparatus of claim 3 wherein said discharge area discharges water in one general direction to the exclusion of the opposite direction and said intake means draws water from one general direction to the exclusion of the opposite direction.

11. An underwater apparatus for the circulation and aeration of waste water in a parent body of water having bed regions comprising:

an axial flow impeller means for drawing water from the bed region of said parent body of water for maximum efficiency in the circulation of said water;

a cylindrical impeller conduit means of minimal inside diameter and minimal length for maximizing the velocity and flow of water during rotation of said impeller means from an impeller inlet to an impeller outlet;

said impeller means being mounted within said impeller conduit means;

means for rotating said impeller means and drawing said water through said apparatus;

intake means adjacent said impeller inlet for directing water from the bed regions of the parent body of water drawn by said impeller means into said impeller conduit means;

a discharge area adjacent said impeller outlet, said discharge area having a channelling means for restricting cavitation and increasing water flow, said channelling means comprising an outwardly flaring upper discharge wall and an outwardly flaring lower discharge wall for directing water flow from said conduit into the parent body of water in a substantially horizontal flow underneath the surface of said parent body of water; and, an enclosed chamber disposed circumferentially about said discharge area and having a common wall with said discharge area and said impeller conduit, said enclosed chamber being pressurizable with a cleansing agent, said common wall including an impeller conduit wall and said outwardly flaring lower discharge wall and having a plurality of discrete equidistant ports circumferentially spaced about each of said impeller conduit wall and said outwardly flaring lower discharge wall, said cleansing agent being injectable under pressure into said discharge area through each of said ports, said cleansing agent thereby being injected into said water at at least two different angles for increased turbulence and increased mixing of said water.

12. An apparatus for the circulation and aeration of waste water in a parent body of water having bed regions comprising:

an axial flow impeller means for drawing water from said bed regions of the parent body of water for maximum efficiency in the circulation of said water;

a cylindrical impeller conduit of minimal inside diameter and length for efficiently conducting the flow of water during rotation of said impeller means from an impeller inlet to an impeller outlet;

said impeller means being mounted within said impeller conduit drawing said water through said apparatus;

intake means adjacent said impeller inlet for directing water drawn by said impeller means into said impeller conduit means, said intake means including a partially enclosed intake area for directing the flow of waste water into said intake area from a desired direction;

a discharge area adjacent said impeller outlet, said discharge area being partially enclosed and having an opening for directing water from said conduit and said discharge area in a substantially horizontal flow and in a desired direction into the surrounding parent body of water; and, said intake means and said discharge area complementing one another to effectively control the circulation of said waste water in said parent body of water and maintain a desired flow pattern.

13. The apparatus of claim 12 further including a chamber disposed generally circumferentially about said discharge area and having a common wall with said discharge area and said impeller conduit, said chamber being pressurizable with a cleansing agent, said common wall having a plurality of ports spaced about said discharge area, said cleansing agent being injectable under pressure into said discharge area through each of said ports causing turbulence and increased mixing of said water.

* * * * *